United States Patent
Roitman et al.

(10) Patent No.: US 11,030,209 B2
(45) Date of Patent: Jun. 8, 2021

(54) UNSUPERVISED LEARNING TO FUSE FOR INFORMATION RETRIEVAL

(71) Applicant: International Business Machines Corporation, Armonk, NY (US)

(72) Inventors: Haggai Roitman, Yokneam Illit (IL); Bar Weiner, Ashqelon (IL); Shai Erera, Gilon (IL)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/234,824

(22) Filed: Dec. 28, 2018

(65) Prior Publication Data

US 2020/0210415 A1 Jul. 2, 2020

(51) Int. Cl.
| | | |
|---|---|---|
| *G06F 16/00* | (2019.01) | |
| *G06F 16/248* | (2019.01) | |
| *G06F 16/2457* | (2019.01) | |
| *G06N 20/00* | (2019.01) | |
| *G06N 7/00* | (2006.01) | |

(52) U.S. Cl.
CPC ...... *G06F 16/248* (2019.01); *G06F 16/24578* (2019.01); *G06N 7/005* (2013.01); *G06N 20/00* (2019.01)

(58) Field of Classification Search
CPC .................. G06F 16/248; G06F 16/24578
See application file for complete search history.

(56) References Cited

U.S. PATENT DOCUMENTS

| | | | | |
|---|---|---|---|---|
| 2004/0267774 A1* | 12/2004 | Lin | ...................... | G06F 16/5838 |
| 2008/0270138 A1* | 10/2008 | Knight | .................. | G06F 16/433 |
| | | | | 704/260 |
| 2010/0005050 A1* | 1/2010 | Ah-Pine | ................. | G06N 5/022 |
| | | | | 706/52 |
| 2017/0270115 A1 | 9/2017 | Cormack et al. | | |

OTHER PUBLICATIONS

Cao Guanqun et al., "Deep Multi-View Learning to Rank", Cornell University Library, Jan. 31, 2018, 12 pages.
Liang Shangsong et al., "Manifold Learning for Rank Aggregation", Proceedings of the 2018 World Wide Web Conference Apr. 23-27, 2018, 10 pages.
Oren Kurland and J. Shane Culpepper, Fusion in Information Retrieval, SIGIR 2018 Half-Day Tutorial, SIGIR '18, Ann Arbor, MI, USA, Jul. 8-12, 2018, pp. 1-4.
Peter Mell and Timothy Grance, The NIST Definition of Cloud Computing, NIST Special Publication 800-145, Sep. 2011, cover, pp. i-iii, pp. 1-3.

\* cited by examiner

*Primary Examiner* — Khanh B Pham
(74) *Attorney, Agent, or Firm* — Daniel Morris; Otterstedt, Wallace & Kammer, LLP

(57) ABSTRACT

Methods and systems for generating and evaluating fused query lists. A query on a corpus of documents is evaluated using a plurality of retrieval methods and a ranked list for each of the plurality of retrieval methods is obtained. A plurality of fused ranked lists is sampled, each fusing said ranked lists for said plurality of retrieval methods, and the sampled fused ranked lists are sorted. In an unsupervised manner, an objective comprising a likelihood that a fused ranked list, fusing said ranked lists for each of said plurality of retrieval methods, is relevant to a query and a relevance event, is optimized to optimize the sampling, until convergence is achieved. Documents of the fused ranked list are determined based on the optimization.

18 Claims, 7 Drawing Sheets

Algorithm 1 Unsupervised Learning-to-Fuse

1: input: $\mathcal{L} = \{L_1, L_2, \ldots, L_m\}, \hat{p}(L_F|q,r), N = 10,000, \alpha = 0.1, \lambda = 0.7$
2: initialize:
3: for $d \in \mathcal{L}$ do
4:      $\mu_d^{t=0} = Score_{CombMNZ}(d|\mathcal{L})$
5:      $\sigma_d^{t=0} = 0.1$
6: end for
7: $L_F^* = CombMNZ(\mathcal{L})$
8: $t = 1$
9: loop
10:      Sample $N$ fused ranked lists $L_F^{(1)}, L_F^{(2)}, \ldots, L_F^{(N)}$ based on current document scoring models $\hat{p}(d|q,r) \sim \mathcal{N}(\mu_d^{t-1}, \sigma_d^{t-1})$
11:      if $\hat{p}(L_F^*|q,r) < \max_{l=1,\ldots,N} \hat{p}(L_F^{(l)}|q,r)$ then
12:          $L_F^* = \arg\max_{l=1,\ldots,N} \hat{p}(L_F^{(l)}|q,r)$
13:      end if
14:      Sort samples $L_F^{(1)}, L_F^{(2)}, \ldots, L_F^{(N)}$ according to $\hat{p}(L_F^{(l)}|q,r)$
15:      Let $\gamma_t$ be the sample $(1-\alpha)$-quantile of the performances: $\hat{p}(L_F^{(l)}|q,r); l = 1,\ldots,N$
16:      for $d \in \mathcal{L}$ do
17:          Let $X_{\gamma_t}$ to be the sum of scores of samples $L_F^{(l)}$ which satisfy: $d \in L_F^{(l)} \wedge \hat{p}(L_F^{(l)}|q,r) \geq \gamma_t$
18:          Let $X_{\gamma_t}^2$ to be the sum of power-scores of samples $L_F^{(l)}$ which satisfy: $d \in L_F^{(l)} \wedge \hat{p}(L_F^{(l)}|q,r) \geq \gamma_t$
19:          $\mu_{\gamma_t} = \frac{X_{\gamma_t}}{\lceil \alpha \cdot N \rceil}$
20:          $\mu_{\gamma_t}^2 = \frac{X_{\gamma_t}^2}{\lceil \alpha \cdot N \rceil}$
21:          Let $\sigma_{\gamma_t} = \sqrt{\mu_{\gamma_t}^2 - (\mu_{\gamma_t})^2}$
22:          Update: $\mu_d^t = \lambda \mu_{\gamma_t} + (1-\lambda)\mu_d^{t-1}$
23:          Update: $\sigma_d^t = \lambda \sigma_{\gamma_t} + (1-\lambda)\sigma_d^{t-1}$
24:      end for
25:      if Convergence criterion met, i.e: $\gamma_t = \gamma_{t-1} = \ldots = \gamma_{t-4}$ then
26:          stop and return $L_F^*$
27:      else
28:          $t = t + 1$
29:      end if
30: end loop

*FIG. 7*

UNSUPERVISED LEARNING TO FUSE FOR INFORMATION RETRIEVAL

BACKGROUND

The present invention relates to the electrical, electronic and computer arts, and more specifically, to information retrieval (IR).

In a fusion-based retrieval task, several rankers are given the same query to be evaluated over the same corpora. The ranked lists of different rankers are then combined together and a single (fused) result list is created. Many approaches have been suggested for this task in IR, and can be classified mainly as supervised and unsupervised methods. Unsupervised methods combine the different ranked lists without utilizing any relevance labels. Example of such methods include the CombX score-based methods (where X stands for SUM (summation), AVG (average), MULT (multiplication), MNZ (Multiply-by-Number-Non-Zero; the number of lists that contain a given document), GEO (geometric—fused score can be calculated by the geometric mean of the document's scores), and the like); rank-based methods (such as Rich Release Format (RRF), Rank Aggregation, and the like), and Concordance-based methods (such as Borda-Count). Other methods utilize inter-document similarities and are based on the Cluster Hypothesis in IR (such as ClustFuse). Supervised methods train a ranking model based on relevance labels (such as LambdaMerge, Manifold-Learning, and the like).

SUMMARY

Principles of the invention provide unsupervised learning-to-fuse techniques for information retrieval. In one aspect, an exemplary method includes the step of evaluating a query on a corpus of documents using a plurality of retrieval methods; obtaining a ranked list for each of the plurality of retrieval methods; sampling a plurality of fused ranked lists, each fusing said ranked lists for said plurality of retrieval methods; sorting said sampled fused ranked lists; in an unsupervised manner, optimizing an objective comprising a likelihood that a fused ranked list, fusing said ranked lists for each of said plurality of retrieval methods, is relevant to a query and a relevance event, to optimize said sampling, until convergence is achieved; and determining documents of the fused ranked list based on the optimization.

In one aspect, an exemplary apparatus comprises a memory; and at least one processor, coupled to the memory, and operative to perform operations comprising: evaluating a query on a corpus of documents using a plurality of retrieval methods; obtaining a ranked list for each of the plurality of retrieval methods; sampling a plurality of fused ranked lists, each fusing said ranked lists for said plurality of retrieval methods; sorting said sampled fused ranked lists; in an unsupervised manner, optimizing an objective comprising a likelihood that a fused ranked list, fusing said ranked lists for each of said plurality of retrieval methods, is relevant to a query and a relevance event, to optimize said sampling, until convergence is achieved; and determining documents of the fused ranked list based on the optimization.

In one aspect, an exemplary non-transitory computer readable medium comprises computer executable instructions which when executed by a computer cause the computer to perform operations comprising: evaluating a query on a corpus of documents using a plurality of retrieval methods; obtaining a ranked list for each of the plurality of retrieval methods; sampling a plurality of fused ranked lists, each fusing said ranked lists for said plurality of retrieval methods; sorting said sampled fused ranked lists; in an unsupervised manner, optimizing an objective comprising a likelihood that a fused ranked list, fusing said ranked lists for each of said plurality of retrieval methods, is relevant to a query and a relevance event, to optimize said sampling, until convergence is achieved; and determining documents of the fused ranked list based on the optimization.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

generation of a fused query result set based on the search results of a plurality of rankers; and improving search quality by utilizing a plurality of retrieval strategies which judge the same document collection (thereby improving the technological process of computerized information retrieval).

These and other features and advantages of the present invention will become apparent from the following detailed description of illustrative embodiments thereof, which is to be read in connection with the accompanying drawings.

BRIEF DESCRIPTION OF THE DRAWINGS

FIG. 7 shows pseudo-code for an exemplary unsupervised learning-to-fuse algorithm, according to an aspect of the invention.

DETAILED DESCRIPTION

Figure 1:
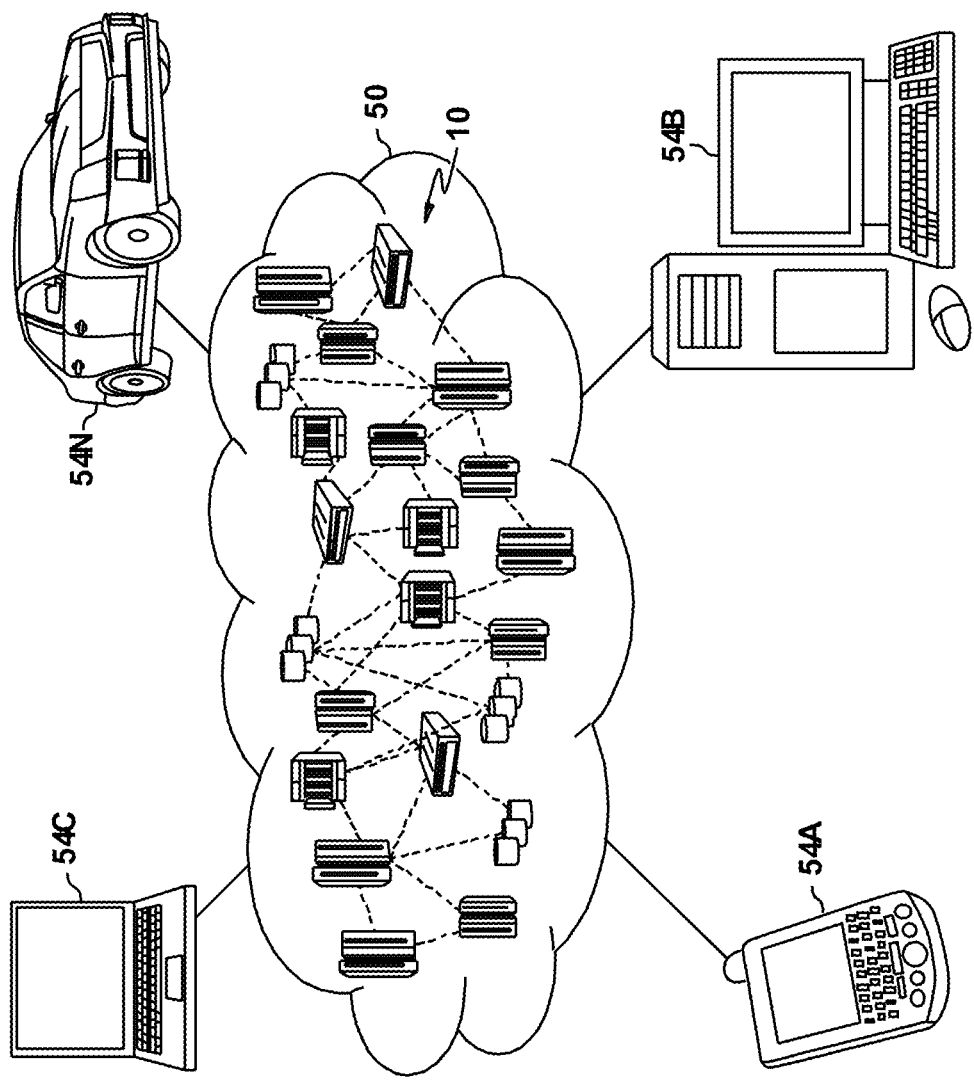
FIG. 1 depicts a cloud computing environment according to an embodiment of the present invention.

Generally, an unsupervised learning-to-fuse technique for information-retrieval is disclosed. A derivation of a novel fusion optimization target function, which surrogates the quality estimate of fusion-based retrieval, is used in one or more embodiments. An "optimal" fusion-based ranking is found, in one or more instances, given a pool of documents obtained from the various base rankers by finding a maximum likelihood distribution of document (fusion) scores used to rank the documents. In general, the more consensus a document gets from different "judges" (retrieval methods) and the more independent the decisions of the retrieval methods, the more likely the fusion will provide better results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
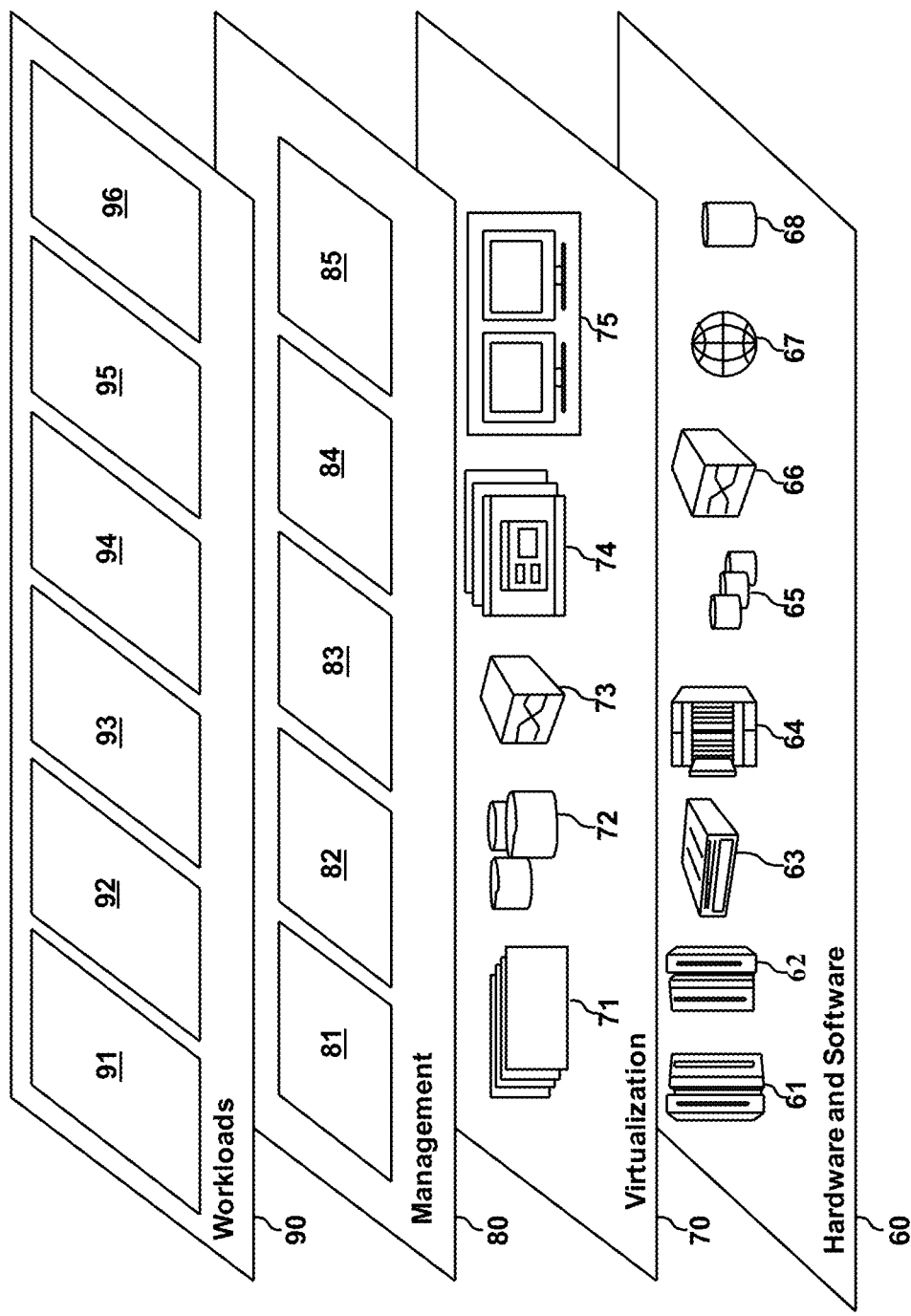
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and unsupervised learning-to-fuse for information retrieval service 96.

Numerous rankers, such as TF-IDF (term frequency-inverse document frequency; a numerical statistic for indicating the importance of a word in a document), BM25 (a similarity ranking), language model-based (a query, likelihood model), and the like, are available to rank, for example, documents relative to a query. Each ranker will generate a potentially unique ranked query result list based on the ranking algorithm. In one example embodiment, the result lists from a plurality of rankers are fused into a single fused result list in order to improve the performance of a computer in generating query results.

Fusion-Based Retrieval

Let q denote a query and let C denote a corpus of documents that are considered during the query. In a fusion-based retrieval setting, query q is evaluated over corpus C using several different retrieval methods. Let $L=\{L_1, L_2, \ldots, L_m\}$ denote a set of m (>1) ranked lists, where each ranked list $L_i$ ($\in L$) contains the top-k documents d ($\in C$) with the highest retrieval scores $SL_i$ (d|q) according to the i-th retrieval method (i$\in\{1, 2 \ldots, m\}$). A fusion method F takes L as an input and returns an aggregated (top-k) ranked list, hereinafter termed the fused-list and denoted $L_F$. Examples of common fusion methods include Comb SUM, CombMNZ, RRF and Borda.

Unsupervised Learning to Fuse Approach

Given fused-list $L_F$, let $p(L_F|q, r)$ denote the (post-retrieval) likelihood that $L_F$ contains relevant information to query q, where r denotes a "relevance event." The following unsupervised learning problem is defined as:

$$L_F^* \stackrel{def}{=} \arg\max_{L_F \subseteq L} p(L_F | q, r)$$

The learning problem is, therefore, to find a (fused) ranked list over document pool L, with the highest likelihood to contain relevant information to query q. Since $p(L_F|q, r)$ is unknown, it is estimated using the following estimator:

$$\hat{p}(L_F|q,r) \stackrel{def}{=} \Sigma_{L_i \in L} p(L_F|L_i,r) p(L_i|q,r)$$

To estimate $p(L_i|q, r)$, the weighted information gain QPP method is used, given as follows:

$$\hat{p}_{WIG}(L_i | q, r) \stackrel{def}{=} \frac{1}{k\sqrt{|q|}} \sum_{d \in L_i} (SL_i(d | q) - S(C | q))$$

where denotes the query length and S(C|q) is the corpus score given by concatenating all document texts in C. Next, $p(L_F|L_i, r)$ is estimated as follows:

$$\hat{p}(L_F | L_i, r) \stackrel{def}{=}$$
$$sim(L_F, L_i) \sum_{d \in L_F} p(d | L_F) \left( \frac{\sum_w \hat{p}(w | \theta_{R_{|L_i|}})[\log \hat{p}(w | \theta_d) - \log \hat{p}(w | \theta_C)]}{-\sum_w \hat{p}(w | \theta_{L_i}) \log \hat{p}(w | \theta_{L_i})} \right)$$

$\theta_{R_{|L_i|}}$ denotes the Relevance Model 1 (RM1) relevance model induced from list $L_i$; $\theta_d$ is document d's language model; and $\theta_{L_i}$ is list $L_i$'s centroid language model. The term $sim(L_F, L_i)$ denotes the symmetric list similarity measure (e.g., recommended similarity is the Ranked Biased Overlap—RBO similarity with parameter 0.95).

Model Learning

To solve the optimization problem and learn the "optimal" ranking, the Cross-Entropy (CE) Method (which is a global optimization approach) is used in one or more embodiments. To this end, the ranking sampling space is defined. Let p(d|q, r) denote the likelihood that document d is relevant to query q. Since this likelihood is unknown, it is estimated. Given such likelihoods, documents d∈L is ranked accordingly and $L_F$ is obtained.

Further, assume that p(d|q, r)~N($\mu_d$, $\sigma_d$). Therefore, using the CE method, the optimal set of parameters for each document d is estimated such that the objective is maximized. For initialization, assume that $\mu_d$ is the document score according to a weak fusion function (e.g., CombMNZ) and $\sigma_d$=0.1. Using the CE method, importance sampling is used to update the estimates of this parameter.

In addition, to realize the objective, p(d|$L_F$), which defines the likelihood that document d belongs to sampled ranked list $L_F$, is set. To this end, p(d|$L_F$) is defined:

$$p(d \mid L_F) \stackrel{def}{=} \frac{p(d \mid q, r)}{\sum_{d \in L_F} p(d \mid q, r)}$$

Based on the above equation for p(d|$L_F$), the fused list can be derived by selecting the k documents d that have the highest probabilities.

Figure 3:
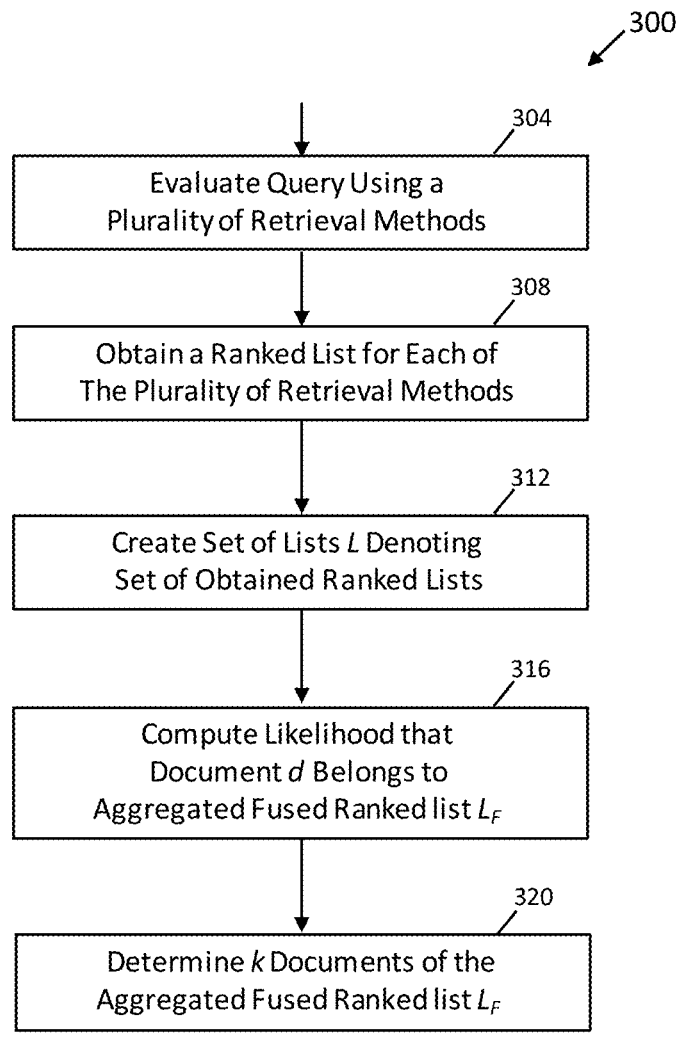
FIG. 3 is a flowchart of an example method for generating a fused ranked list, in accordance with an example embodiment.

FIG. 3 is a flowchart of an example method 300 for generating a fused ranked list, in accordance with an example embodiment. In one example embodiment, a query is evaluated using a plurality of retrieval methods, where q denotes a query and C denotes a corpus of documents (operation 304). A ranked list is obtained for each of the plurality of retrieval methods (operation 308). A set of ranked lists L is created, where L={$L_1$, $L_2$, ..., $L_m$} denotes a set of the m (>1) ranked lists, where each ranked list L (∈L) contains the top-k documents d (∈C) with the highest retrieval scores $SL_i$(d|q) according to the i-th retrieval method (i∈{1; 2 ..., m}) (operation 312). The likelihood that document d belongs to a sampled fused ranked list $L_F$ (p(d|$L_F$)) is computed (operation 316), where $$p(d \mid L_F) \stackrel{def}{=} \frac{p(d \mid q, r)}{\sum_{d \in L_F} p(d \mid q, r)}$$

and p(d|q, r) denotes the likelihood that document d is relevant to query q and $L_F$ is an aggregated (top-k) ranked fused-list. The k documents d of the aggregated ranked fused-list $L_F$ are determined according to the documents d having the highest probabilities p(d|$L_F$) (operation 320). In one example embodiment, the method 300 further comprises generating a user interface for displaying an identification of the k documents of the aggregated ranked fused-list $L_F$.

Figure 4:
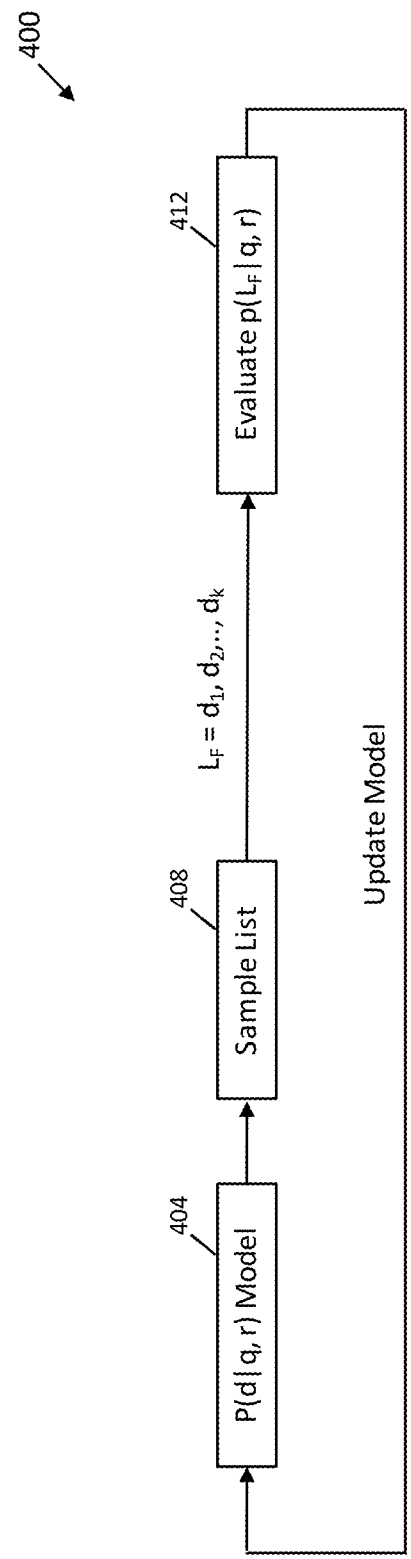
FIG. 4 is a flowchart of an example method for generating an unsupervised learning-to-fuse model, in accordance with an example embodiment.

FIG. 4 is a flowchart of an example method 400 for generating an unsupervised learning-to-fuse model, in accordance with an example embodiment. In one example embodiment, an unsupervised learning-to-fuse model is generated (or revised) (operation 404), as described more fully above. A sample list ($L_F$) is generated based on the generated or revised model (operation 408). The model (p($L_F$|q,r)) is evaluated (operation 412) and the method 400 proceeds with operation 404 to revise (update) the model based on the results of the evaluation.

Figure 5:
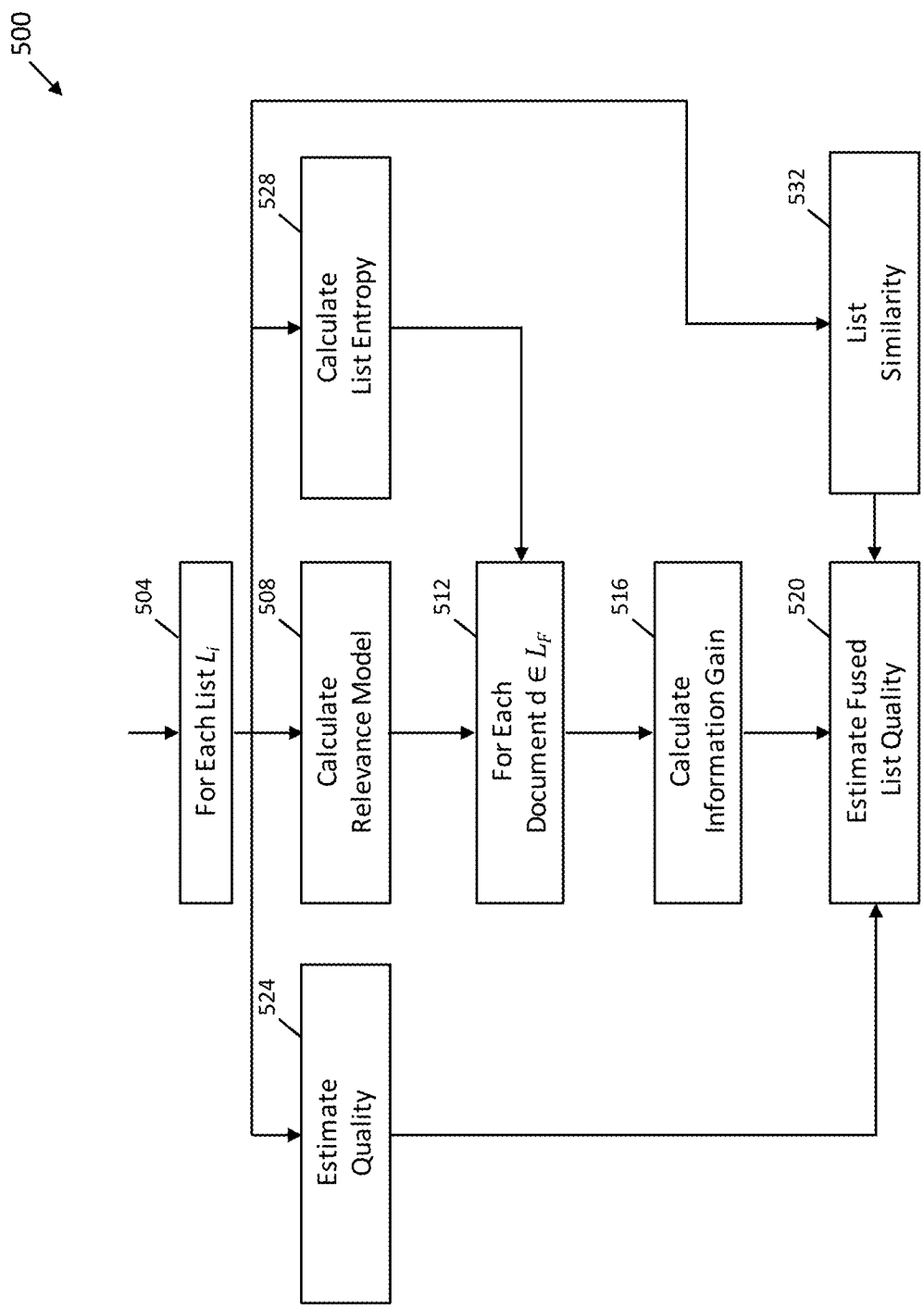
FIG. 5 is a flowchart of an example method for estimating the quality of a fused list, in accordance with an example embodiment.

FIG. 5 is a flowchart of an example method 500 for estimating the quality of a fused list, in accordance with an example embodiment. In one example embodiment, as indicated at 504, operations 508 through 532 of method 500 are performed for each candidate list $L_i$. A relevance model is calculated (operation 508) and a list entropy is calculated (operation 528). For each document d that is an element of a fused list $L_F$ (operation 512), the information gain is calculated (operation 516) based on the calculated list entropy. In operation 520, once a list of documents is sampled, the fused list quality is then estimated based on the calculated information gain, the estimated quality (operation 524) and the list similarity (operation 532). That is to say, once a list of documents is sampled, one or more embodiments estimate the list's quality using (p($L_F$|q,r)). The optimization uses the operations of FIG. 4 (or the pseudo-code in FIG. 7) to learn the best sampling policy which maximizes that quality.

During operation 532, the similarity is determined between the fused list $L_F$ and each of the candidate lists $L_i$. That is to say, operation 532 is an operation between two lists, one is any of the initial lists $L_i$ and one is the sampled fused list $L_F$ whose quality it is desired to estimate. In one example embodiment, the operations of method 500 are repeated to revise the estimated fused list quality in response to an addition of a supplemental retrieval method to the plurality of retrieval methods.

FIG. 7 provides pseudo-code for an exemplary unsupervised learning-to-fuse algorithm, according to an aspect of the invention. The pseudo-code describes in detail the iterative learning process for generating the optimal fused list (which is also illustrated in FIGS. 4 and 5). For example, the pseudo-code calculates the quality of a single sampled fused list $L_F$, i.e., the pseudo-code calculates the p($L_F$|q,r) measure. FIG. 7 thus illustrates the calculation of the quality of a single sampled fused list $L_F$, i.e., the p($L_F$|q,r) measure.

Some example embodiments include the operations of, as at 304, evaluating a query on a corpus of documents using a plurality of retrieval method; obtaining 308 a ranked list for each of the plurality of retrieval method; computing 316 a likelihood that a given document of the corpus of documents belongs to an aggregated fused ranked list which fuses the ranked lists for each of the plurality of retrieval method; and determining 320 documents of the aggregated fused ranked list based on the likelihood computation.

In one example embodiment, q denotes the query; C denotes the corpus; d denotes the given document of the corpus of documents; r denotes a relevance event; $L_F$ denotes the fused ranked list;

$$p(d \mid L_F) \stackrel{def}{=} \frac{p(d \mid q, r)}{\sum_{d \in L_F} p(d \mid q, r)};$$

and
p(d|q, r) denotes a likelihood that document d is relevant to query q; and where the determining the documents operation further comprises selecting k documents having a highest value of p(d|$L_F$).

In one example embodiment, the operations further comprise, as at 312, creating a set of ranked lists L, where L={$L_1$, $L_2$, ..., $L_m$} denotes a set of a plurality of ranked lists from the obtaining step, where each ranked list $L_i$ (∈L) contains a top-k documents d (∈C) having a highest retrieval score $SL_i$ (d|q) according to an i-th one of the retrieval methods (i∈{1; 2 ..., m}); wherein the set of ranked lists L comprises an input to the computing and determining operations. In one example embodiment, the operations further comprise computing 508 a relevance model for ranked list $L_i$; computing 528 a list entropy for the ranked list $L_i$; calculating 516 an information gain based on the computed list entropy for each document d that is an element of a fused list $L_F$; calculating 524 an estimated quality; determining 532 a list similarity between the fused list $L_F$ and the ranked list $L_i$; and estimating 520 the fused list quality based on the calculated information gain, the estimated quality, and the list similarity in response to sampling the ranked list $L_i$.

In one example embodiment, the operations further comprise, as at 504, revising the estimated fused list quality by processing a next ranked list $L_i$. In one example embodiment, the operations further comprise generating 404 an unsupervised learning-to-fuse model. In one example embodiment, the operations further comprise evaluating the unsupervised learning-to-fuse model 412 and updating the unsupervised learning-to-fuse model based on results of the evaluation 404.

Given the discussion thus far, it will be appreciated that, in general terms, an exemplary method, according to an aspect of the invention, includes the operations of, as at 304, evaluating a query on a corpus of documents using a plurality of retrieval methods (refer to preliminary step to get input $\{L_1 \ldots L_m\}$ in the pseudocode of FIG. 7); obtaining a ranked list for each of the plurality of retrieval methods 308 (refer to line 1 in the pseudocode of FIG. 7); sampling a plurality of fused ranked lists, each fusing said ranked lists for said plurality of retrieval methods (refer to line 10 in the pseudocode of FIG. 7); sorting said sampled fused ranked lists (refer to line 14 in the pseudocode of FIG. 7); in an unsupervised manner, optimizing an objective comprising a likelihood that a fused ranked list, fusing said ranked lists for each of said plurality of retrieval methods, is relevant to a query and a relevance event, to optimize said sampling, until convergence is achieved (refer to lines 16-29 in the pseudocode of FIG. 7); and determining one or more documents of the fused ranked list based on the optimization (refer to line 26 in the pseudocode of FIG. 7).

In one example embodiment, q denotes the query; C denotes the corpus; d denotes a given document of the corpus of documents; r denotes a relevance event; $L_F$ denotes a given one of the fused ranked lists;

$$p(d|L_F) \stackrel{def}{=} \frac{p(d|q,r)}{\sum_{d \in L_F} p(d|q,r)};$$

and p(d|q, r) denotes a likelihood that document d is relevant to query q; and where each of the fused ranked lists includes k documents having a highest value of $p(d|L_F)$.

In one example embodiment, the optimizing comprises: computing 508 a relevance model for each of the ranked lists, each of the rankled lists being designated as $L_i$; computing 528 a list entropy for each of the ranked lists $L_i$; calculating 516 an information gain based on the computed list entropy for each document d that is an element of the given fused list $L_F$; calculating 524 an estimated quality; determining 532 a list similarity between the fused list $L_F$ and the ranked list $L_i$; and estimating 520 the fused list quality based on the calculated information gain, the estimated quality, and the list similarity in response to sampling the ranked list $L_i$.

In one example embodiment, the operations further comprise, as at 504, revising the estimated fused list quality by processing a next ranked list $L_i$. In one example embodiment, the operations further comprise revising the estimated fused list quality in response to an addition of a supplemental retrieval method to the plurality of retrieval methods. In one example embodiment, the operations further comprise re-optimizing the objective in response to an addition of a supplemental retrieval method to the plurality of retrieval methods. In one example embodiment, the operations further comprise generating a user interface for displaying an identification of the one or more documents of the fused ranked list.

In one example embodiment, an apparatus comprises a memory 28; and at least one processor 16, coupled to the memory, and operative to perform operations comprising: evaluating a query on a corpus of documents using a plurality of retrieval methods 304 (refer to preliminary step to get input $\{L_1 \ldots L_m\}$ in the pseudocode of FIG. 7); obtaining a ranked list for each of the plurality of retrieval methods 308 (refer to line 1 in the pseudocode of FIG. 7); sampling a plurality of fused ranked lists, each fusing said ranked lists for said plurality of retrieval methods (refer to line 10 in the pseudocode of FIG. 7); sorting said sampled fused ranked lists (refer to line 14 in the pseudocode of FIG. 7); in an unsupervised manner, optimizing an objective comprising a likelihood that a fused ranked list, fusing said ranked lists for each of said plurality of retrieval methods, is relevant to a query and a relevance event, to optimize said sampling, until convergence is achieved (refer to lines 16-29 in the pseudocode of FIG. 7); and determining one or more documents of the fused ranked list based on the optimization (refer to line 26 in the pseudocode of FIG. 7).

In one example embodiment, a non-transitory computer readable medium comprises computer executable instructions which when executed by a computer cause the computer to perform operations comprising: evaluating a query on a corpus of documents using a plurality of retrieval methods (refer to preliminary step to get input $\{L_1 \ldots L_m\}$ in the pseudocode of FIG. 7); obtaining a ranked list for each of the plurality of retrieval methods 308 (refer to line 1 in the pseudocode of FIG. 7); sampling a plurality of fused ranked lists, each fusing said ranked lists for said plurality of retrieval methods (refer to line 10 in the pseudocode of FIG. 7); sorting said sampled fused ranked lists (refer to line 14 in the pseudocode of FIG. 7); in an unsupervised manner, optimizing an objective comprising a likelihood that a fused ranked list, fusing said ranked lists for each of said plurality of retrieval methods, is relevant to a query and a relevance event, to optimize said sampling, until convergence is achieved (refer to lines 16-29 in the pseudocode of FIG. 7); and determining one or more documents of the fused ranked list based on the optimization (refer to line 26 in the pseudocode of FIG. 7).

Figure 6:
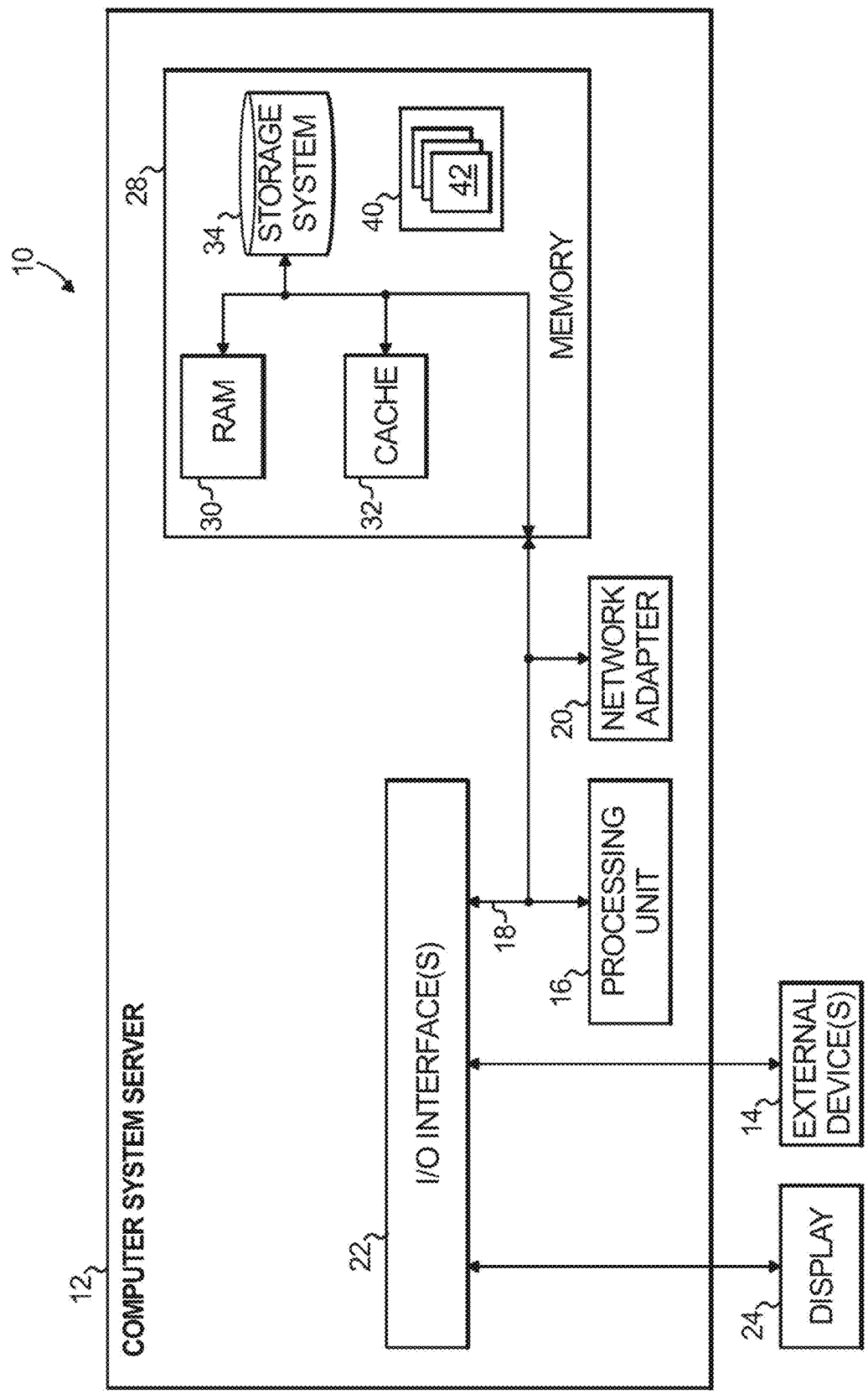
FIG. 6 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    evaluating, using a hardware processor exercising a plurality of rankers, a query on a corpus of electronic documents stored in a document database using a plurality of retrieval methods corresponding to the plurality of rankers;
    obtaining, using the hardware processor, a ranked list for each of the plurality of retrieval methods;
    generating, using the hardware processor, a plurality of fused ranked lists;
    sampling, using the hardware processor, the plurality of fused ranked lists, each fused ranked list fusing said ranked lists for said plurality of retrieval methods;
    sorting, using the hardware processor, said sampled fused ranked lists;
    in an unsupervised manner, optimizing, using the hardware processor, an objective comprising a likelihood that a fused ranked list, fusing said ranked lists for each of said plurality of retrieval methods, is relevant to a query and a relevance event, to optimize said sampling, until convergence is achieved;
    determining, using the hardware processor, documents of the fused ranked list based on the optimization; and
    generating a user interface for displaying an identification of the documents of the fused ranked list.

2. The method of claim 1, where each fused rank list is generated based on the relationship:

$$p(d \mid L_F) \stackrel{def}{=} \frac{p(d \mid q, r)}{\sum_{d \in L_F} p(d \mid q, r)};$$

and where:
    q denotes the query;
    C denotes the corpus;
    d denotes a given document of the corpus of documents;
    r denotes a relevance event;
    $L_F$ denotes a given one of the fused ranked lists;
    $p(d|q, r)$ denotes a likelihood that document d is relevant to query q; and where each of the fused ranked lists includes k documents having a highest value of $p(d|L_F)$.

3. The method of claim 2, wherein the optimizing comprises:
    computing a relevance model for each of the ranked lists, each of the rankled lists being designated as $L_i$;
    computing a list entropy for each of the ranked lists $L_i$;
    calculating an information gain based on the computed list entropy for each document d that is an element of the given fused list $L_F$;
    calculating an estimated quality;
    determining a list similarity between the fused list $L_F$ and the ranked list $L_i$; and
    estimating the fused list quality based on the calculated information gain, the estimated quality, and the list similarity in response to sampling the ranked list $L_i$.

4. The method of claim 3, further comprising revising the estimated fused list quality by processing a next ranked list $L_i$.

5. The method of claim 3, further comprising revising the estimated fused list quality in response to an addition of a supplemental retrieval method to the plurality of retrieval methods.

6. The method of claim 1, further comprising re-optimizing the objective in response to an addition of a supplemental retrieval method to the plurality of retrieval methods.

7. An apparatus comprising:
a memory; and
at least one processor, coupled to said memory, and operative to perform operations comprising:
evaluating, using a plurality of rankers, a query on a corpus of documents using a plurality of retrieval methods corresponding to the plurality of rankers;
obtaining a ranked list for each of the plurality of retrieval methods;
generating a plurality of fused ranked lists;
sampling the plurality of fused ranked lists, each fused ranked list fusing said ranked lists for said plurality of retrieval methods;
sorting said sampled fused ranked lists;
in an unsupervised manner, optimizing an objective comprising a likelihood that a fused ranked list, fusing said ranked lists for each of said plurality of retrieval methods, is relevant to a query and a relevance event, to optimize said sampling, until convergence is achieved;
determining documents of the fused ranked list based on the optimization; and
generating a user interface for displaying an identification of the documents of the fused ranked list.

8. The apparatus of claim 7, where each fused rank list is generated based on the relationship:

$$p(d \mid L_F) \stackrel{def}{=} \frac{p(d \mid q, r)}{\sum_{d \in L_F} p(d \mid q, r)};$$

and where:
q denotes the query;
C denotes the corpus;
d denotes a given document of the corpus of documents;
r denotes a relevance event;
$L_F$ denotes a given one of the fused ranked lists;
p(d|q, r) denotes a likelihood that document d is relevant to query q; and where each of the fused ranked lists includes k documents having a highest value of $p(d|L_F)$.

9. The apparatus of claim 8, wherein the optimizing comprises:
computing a relevance model for each of the ranked lists, each of the rankled lists being designated as $L_i$;
computing a list entropy for each of the ranked lists $L_i$;
calculating an information gain based on the computed list entropy for each document d that is an element of the given fused list $L_F$;
calculating an estimated quality;
determining a list similarity between the fused list $L_F$ and the ranked list $L_i$; and
estimating the fused list quality based on the calculated information gain, the estimated quality, and the list similarity in response to sampling the ranked list $L_i$.

10. The apparatus of claim 9, the operations further comprising revising the estimated fused list quality by processing a next ranked list $L_i$.

11. The apparatus of claim 9, the operations further comprising revising the estimated fused list quality in response to an addition of a supplemental retrieval method to the plurality of retrieval methods.

12. The apparatus of claim 7, the operations further comprising re-optimizing the objective in response to an addition of a supplemental retrieval method to the plurality of retrieval methods.

13. A non-transitory computer readable medium comprising computer executable instructions which when executed by a computer cause the computer to perform operations comprising:
evaluating, using a plurality of rankers, a query on a corpus of documents using a plurality of retrieval methods corresponding to the plurality of rankers;
obtaining a ranked list for each of the plurality of retrieval methods;
generating a plurality of fused ranked lists;
sampling the plurality of fused ranked lists, each fused ranked list fusing said ranked lists for said plurality of retrieval methods;
sorting said sampled fused ranked lists;
in an unsupervised manner, optimizing an objective comprising a likelihood that a fused ranked list, fusing said ranked lists for each of said plurality of retrieval methods, is relevant to a query and a relevance event, to optimize said sampling, until convergence is achieved;
determining documents of the fused ranked list based on the optimization; and
generating a user interface for displaying an identification of the documents of the fused ranked list.

14. The non-transitory computer readable medium of claim 13, where each fused rank list is generated based on the relationship:

$$p(d \mid L_F) \stackrel{def}{=} \frac{p(d \mid q, r)}{\sum_{d \in L_F} p(d \mid q, r)};$$

and where:
q denotes the query;
C denotes the corpus;
d denotes a given document of the corpus of documents;
r denotes a relevance event;
$L_F$ denotes a given one of the fused ranked lists;
p(d|q, r) denotes a likelihood that document d is relevant to query q; and where each of the fused ranked lists includes k documents having a highest value of $p(d|L_F)$.

15. The non-transitory computer readable medium of claim 14, wherein the optimizing comprises:
computing a relevance model for each of the ranked lists, each of the rankled lists being designated as $L_i$;
computing a list entropy for each of the ranked lists $L_i$;
calculating an information gain based on the computed list entropy for each document d that is an element of the given fused list $L_F$;
calculating an estimated quality;
determining a list similarity between the fused list $L_F$ and the ranked list $L_i$; and
estimating the fused list quality based on the calculated information gain, the estimated quality, and the list similarity in response to sampling the ranked list $L_i$.

16. The non-transitory computer readable medium of claim 15, the operations further comprising revising the estimated fused list quality by processing a next ranked list $L_i$.

17. The non-transitory computer readable medium of claim 15, the operations further comprising revising the estimated fused list quality in response to an addition of a supplemental retrieval method to the plurality of retrieval methods.

18. The non-transitory computer readable medium of claim 13, the operations further comprising re-optimizing the objective in response to an addition of a supplemental retrieval method to the plurality of retrieval methods.

\* \* \* \* \*